United States Patent Office 3,027,258
Patented Mar. 27, 1962

3,027,258
METHOD OF PRODUCING A CHIP-TYPE
FOOD PRODUCT
Pericles Markakis, East Lansing, Mich., Thomas M. Freeman, Hollis, N.Y., and Walter H. Harte, Baltimore, Md., assignors to DCA Food Industries Inc., New York, N.Y., a corporation of New York
No Drawing. Filed Mar. 21, 1961, Ser. No. 97,127
6 Claims. (Cl. 99—81)

The present invention relates generally to an improved comestible and to an improved process for producing the same, and in particular it relates to an improved synthetic chip-type food product and to an improved method for producing the same. The present application is a continuation-in-part of copending patent application Serial No. 697,718, filed November 20, 1957, and now abandoned.

A very popular form of food product is provided in chip form, as exemplified by the potato chip. The popularity of this type of food may be attributed, to a large extent, to its physical characteristics and ease in serving and eating. However, the conventionally available potato chip and other foods of similar nature possess many disadvantages and drawbacks. Nutritionally, they leave much to be desired, being principally starch and fat, containing only negligible amounts of protein. The synthetic chip-type foods presently available possess none of the physical qualities desirable in food products in this form.

It is thus a principal object of the present invention to provide an improved synthetic chip-type comestible.

Another object of the present invention is to provide an improved method for the production of comestibles of such type.

Other and further objects of the present invention will become apparent from a reading of the following description.

It has been discovered that when a dough is formed containing vital gluten, gelatinized amylopectin and inert materials in certain proportions, and the dough is shaped and cooked, a synthetic chip-type food product is obtained which possesses an excellent bite and "go away" comparable or superior to that of potato chips and is of much greater nutritional value. What is meant by inert material is any edible material other than vital gluten and amylopectin which is a non-oily or non-fatty substance and which does not form a film of the nature and elasticity of a vital gluten film. Illustrative of the inert materials are: amylose, for example, amylose starch fractions of wheat, corn, potato or tapioca starch; nutrient supplements, for example, low fat soya flour, devitalized dried gluten, dried beef, fish meal, milk products—e.g. dried buttermilk whey and dried skim milk, and L-lysine monohydrochloride; sugars, for example, sucrose, dextrose, maltose and lactose; stabilizers and thickeners, for example, methyl cellulose, carboxy methylcellulose, agar-agar, carragheen and sodium caseinate; flavoring materials, such as, spices—e.g. paprika, garlic and onion, artificial flavor—e.g. acetylmethyl, carbinol, butyric acid and caproic acid, natural flavors—e.g. dried cheeses, salt—e.g. sodium chloride and monosodium glutamate, dried yeast—e.g. active and inactive dried yeast; buffering agents, acid and alkali salts, for example, buffer salts—e.g. ammonium phosphate (mono and dibasic), calcium lactate and calcium phosphate (mono and tribasic), acids—e.g. lactic and citric acid, alkali salts—e.g. ammonium carbonate magnesium hydroxide and sodium bicarbonate; wetting agents, for example, glycerine and propylene glycol; sequestrants, for example, sodium pyro phosphate and sodium tri poly phosphate; dough conditioners, for example, calcium peroxide and potassium iodate; food colors, for example, annatto, tartrazine—FD&C Yellow #5 and Caratene—natural and synthetic; preservatives, for example, calcium propionate and sodium propionate; anti-oxidants, for example, butylated hydroxyanisole, butylated hydroxytoluene, propyl gallate, potassium bisulphite, tocopherol and citric acid.

In addition to water, as will be hereinafter set forth, the dough advantageously contains up to 15% of a shortening, preferably between 0.0% and 10%, for example, 6.5% and up to 5% of an emulsifying agent such as, for example, the mono and polyglycerides, lecithin, polyoxyethylene monostearate and sorbitan monostearate, advantageously between 0.0% and 2.0%.

The percentages of the vital gluten, amylopectin and inert material present in a dry basis in the dough employed in forming the chip product is represented by the following formula:

$$y = -0.65x + 75 \pm (x - 18)(.45)$$

where $y$ is the percentage amylopectin, $x$ is the percentage of vital gluten and $100-(x+y)$ is the percentage of inert material. The vital gluten should be between approximately 20% and 35% and the amylopectin between approximately 44% and 63%. It should be noted that the conventional dry vital gluten, as the term is herein employed, comprises about 80% protein, 6.8% amylopectin starch, 3.2% amylose starch, and 10% inert material. When quantities or percentages of amylopectin and inert materials are referred to, this does not include those forming part of the vital gluten as aforesaid.

In addition to the above, the water content of the shaped dough immediately prior to cooking, where the cooking is affected by deep frying, should be preferably below 15%, for example, 5% to 15% of the dry ingredients. In the finished product, in addition to the dry ingredients above set forth, there is the fat absorbed during the deep frying step. It should be noted that the cooking step may be effected in any non-aqueous medium such as, for example, by baking, high frequency heating, etc.

The starting materials may be derived from any desirable source. For example, the amylopectin may consist of waxy maize starch, either pregelatinized or gelatinized, as will be hereinafter set forth; the gluten is commercially available as dry vital gluten or may be obtained in a fresh moist state from wheat flour; and the inert ingredients may be selected as desired.

In producing the improved product by the present method, for example, the dry ingredients are mixed with water to produce a stiff dough; the dough is formed to the desired shape, for example, flat, round flakes; dried to below 15% moisture where the original moisture content exceeds this amount or the desired lower percentage; and then the dried, shaped dough pieces are deep fried or otherwise cooked as above. The amount of water employed to produce the dough advantageously does not exceed 150% of the dry ingredients and may be as low as 15% thereof and is preferably between 30% and 100%. The cut dough is preferably dried to a moisture content between 5% and 10%.

In producing the stiff dough, the vital gluten, the pregelatinized starch and the inert ingredients are admixed in the proportions above set forth. Water is then added to the dry ingredients in an amount just sufficient to form a stiff dough, for example, between 65% and 100% of the dry ingredients, and mixed for about ten minutes in a sigma blade mixer. Chilled water is employed to maintain sugar formation at a minimum. Where the inert ingredients include amylose starch, the amylose starch should preferably also be pregelatinized.

It may be desirable to employ ungelatinized amylose, ungelatinized amylopectin or both as a starting material. In this case, the ungelatinized amylose and amylopectin are gelatinized in any conventional manner before the addition of the vital gluten. Thus, when raw potatoes are employed as the major inert ingredient, these may be cut and boiled or steamed to effect gelatinization and the other ingredients including the gluten, then added and mixed to form the low water stiff dough. Furthermore, in place of the dry vital gluten, freshly prepared vital gluten may be employed. The dough may also include any suitable lubricant, such as oil or fat. Where raw potatoes, wet gluten or other moist starting materials are employed, such that the water content is in excess of 100% of the raw ingredients or that needed for a stiff dough, dry ingredients may be added to reduce the water ratio while maintaining the required proportions of the dry ingredients as aforesaid. The added dry ingredients may consist of the dry chips, prior to cooking, in a suitably comminuted state.

The stiff dough is then formed into flakes or chips in any suitable or conventional manner, the chips or flakes preferably being between .025 and .100 inch thick. The dough may be rolled into a sheet of the desired thickness and die cut into chips, the trimmings being recycled or cut transversely into strips. In the alternative, the dough may be pelletized, for example, by extruding the dough into thin rods and cutting the rods transversely into pellets. The pellets are then flaked between rolls either before or after drying. Still another method is to form a thick rod of the dough and to slice the dough directly into thin flakes.

Before cooking or frying the shaped pieces of dough, the moisture content thereof is reduced to below about 15%. The drying of the shaped pieces of dough should be effected without the denaturing or devitalizing of the vital gluten and preferably in a rapid manner to minimize the conversion of the starch into sugars. The temperature of the dough during the aforesaid drying step should preferably not exceed about 150° F.

The dried shaped pieces of dough, prior to cooking may be stored for extended periods of time at room temperature without any deleterious effect whatsoever. This is highly advantageous since the product may be sold, distributed, stored and shipped in pre-cooked form, and cooked or fried at the point of distribution of the finished product or at the point of consumption thereof. Thus, the uncooked or unfried product may be produced at a time when raw material and/or labor costs are at their lowest and stored at a minimum of expense. It should be noted that in the case of potato chips, the shelf-life of the product is very short and rancidity and other deterioration sets in quite rapidly.

The dried shaped pieces of dough may then be cooked. In deep frying the shaped pieces, the oil or shortening should be at a temperature between 275° F. and 300° F. and the frying time from one to one and one-half minutes. Although deep frying presents many advantages and is highly preferred, the cooking may be effected by baking, dielectric heating or other methods. The deep fried product is characterized by a crisp good bite, complete ease of "go away" and the absence of horniness. The product possesses a very high protein content which was lacking in potato chips. This desirable combination of qualities is dependent on the particular combination of gelatinized amylopectin, vital gluten and inert ingredients employed in the production of the comestible as above set forth.

The following examples are given merely by was of illustration of the present invention:

Example I

The following ingredients were intimately admixed in the percentages set forth:

| | Percent |
|---|---|
| Pre-cooked instant dried potatoes (dry basis) | 35.3 |
| Gelatinized waxy maize (dry basis) | 35.0 |
| Dry vital gluten (dry basis) | 23.2 |
| Margarine oil | 6.5 |

It should be noted that the relationship of inert materials, amylopectin and vital gluten is approximately 19.0% inert materials, 56.3% amylopectin and 24.7% vital gluten, excluding the shortening. The composition of the potato in the above formula is approximately 18.5% amylose, 31.5% other inert material including ash, primarily $K_2O$, $P_2O_5$ and other oxides, and 50% amylopectin. About 65% water based on the dry ingredients was added and mixture effected in a sigma blade mixer for about ten minutes to produce a stiff dough. The temperature of the water was about 40° F. The dough was shaped into discs about .050 inch thick and 1¼ inches diameter and vacuum dried to a water content of about 12%, the temperature of the dough at no time exceeding 100° F. The dried chips were then deep fried in hot oil at a temperature of 290° F. for a period of one minute. The resulting product was comparable or superior in its physical characteristics to potato chips and far superior nutritionally. The total fat content in the finished chip was between 22% and 25% contrasted with potato chips which have a fat content of about 40%.

The steps in the above example may be varied in accordance with the data earlier set forth. It is important that the relative proportions of the ingredients be maintained within the recited limits, that the water content of the dough before cooking be below the stated maximum and that the gluten be in a vital state prior to the final cooking step.

The following formulations may be substituted for the ingredients employed in Example I and the procedure set forth therein followed:

Example II

| | Percent |
|---|---|
| Precooked instant dried potatoes (dry basis) | 30.9 |
| Gelatinized maize (dry basis) | 35.0 |
| Dry vital gluten (dry basis) | 20.9 |
| Dried beef | 6.7 |
| Shortening | 6.5 |

Example III

| | |
|---|---|
| Precooked instant dried potatoes (dry basis) | 28.3 |
| Gelatinized waxy maize (dry basis) | 35.0 |
| Dry vital gluten (dry basis) | 23.2 |
| Dextrose | 7.0 |
| Shortening | 6.5 |

Example IV

| | |
|---|---|
| Precooked instant dried potatoes (dry basis) | 28.3 |
| Gelatinized waxy maize (dry basis) | 35.0 |
| Dry vital gluten (dry basis) | 23.2 |
| Sodium caseinate | 6.5 |
| Tetra sodium pyro phosphate | 0.5 |
| Shortening | 6.5 |

Example V

| | |
|---|---|
| Precooked instant dried potatoes (dry basis) | 30.6 |
| Gelatinized waxy maize (dry basis) | 35.0 |
| Dry vital gluten (dry basis) | 22.2 |
| Dried cheddar cheese | 4.7 |
| Sodium chloride | 1.0 |
| Shortening | 6.5 |

Example VI

| | Percent |
|---|---|
| Precooked instant dried potatoes (dry basis) | 33.0 |
| Gelatinized waxy maize (dry basis) | 35.0 |
| Dry vital gluten (dry basis) | 22.5 |
| Ammonium carbonate | 0.5 |
| Glycerine | 2.5 |
| Shortening | 6.5 |

Example VII

| | |
|---|---|
| Precooked instant dried potatoes (dry basis) | 35.3 |
| Gelatinized waxy maize (dry basis) | 35.0 |
| Dry vital gluten (dry basis) | 23.2 |
| Calcium peroxide | 0.008 |
| Annatto | 0.025 |
| Shortening | 6.5 |

Example VIII

| | |
|---|---|
| Precooked instant dried potatoes (dry basis) | 35.3 |
| Gelatinized waxy maize (dry basis) | 35.0 |
| Dry vital gluten (dry basis) | 23.2 |
| Calcium propionate | 0.2 |
| Butylated hydroxyanisole | 0.0025 |
| Butylated hydroxytoluene | 0.0025 |
| Shortening | 6.5 |

Example IX

| | |
|---|---|
| Precooked instant dried potatoes (dry basis) | 35.3 |
| Gelatinized waxy maize (dry basis) | 35.0 |
| Dry vital gluten (dry basis) | 23.2 |
| Sorbitan monostearate | 0.7 |
| Shortening | 6.5 |

Example X

| | |
|---|---|
| Precooked instant dried potatoes (dry basis) | 32.5 |
| Gelatinized waxy maize (dry basis) | 32.0 |
| Dry vital gluten (dry basis) | 23.2 |
| Buttermilk powder (dry basis) | 4.0 |
| Ammonium carbonate (dry basis) | 0.4 |
| Calcium peroxide (dry basis) | 0.005 |
| Spice (dry basis) | 0.1 |
| Mono sodium glutamate (dry basis) | 0.15 |
| Glycerine | 1.0 |
| Shortening | 6.5 |
| Calc. percents excluding the shortening amylose | 6.0 |
| Flavoring materials | 4.57 |
|     Buttermilk powder | |
|     Spice | |
|     Mono sodium glutamate | |

| | Percent |
|---|---|
| Alkali salt | 0.43 |
|     Ammonium carbonate | |
| Wetting agents | 1.07 |
|     Glycerine | |
| Dough conditioner | 0.0054 |
|     Calcium peroxide | |

While there have been described and illustrated preferred embodiments of the present invention, it is apparent that numerous alterations and omissions may be made without departing from the spirit thereof.

We claim:

1. An improved method of producing a chip-type food product comprising forming a dough containing 44% to 63% gelatinized amylopectin, 20% to 35% vital gluten, the remainder of the dry ingredients being an inert edible material, and up to about 150% water based on said dry ingredients, wherein said percentages of said gelatinized amylopectin and vital gluten by dry weight are related in accordance with the formula $y = -0.65x + 75 \mp (x-18)(.45)$ where $y$ is amylopectin and $x$ is vital gluten, shaping said dough, reducing the water content thereof to below about 15% in the absence of substantial devitalization of said gluten and thereafter cooking said shaped dough in a substantially non-aqueous medium.

2. An improved method in accordance with claim 1, wherein said inert material includes gelatinized amylose.

3. An improved method in accordance with claim 1, wherein said cooking is defined by a deep frying step.

4. An improved method in accordance with claim 1, wherein said deep frying is at a temperature between 275° F. and 300° F.

5. An improved method in accordance with claim 1, wherein said dough is shaped into forms having a thickness between .025 and .100 inch.

6. The method according to claim 1, wherein said dough contains up to 15% of a shortening.

References Cited in the file of this patent

UNITED STATES PATENTS

| 1,926,347 | Morrow | Sept. 12, 1933 |
| 2,160,902 | Raymond | June 6, 1939 |
| 2,168,246 | Shepherd | Aug. 1, 1939 |
| 2,469,995 | Schaul | May 10, 1949 |
| 2,526,792 | Alderman | Oct. 24, 1950 |
| 2,665,208 | Speiser | Jan. 5, 1954 |